No. 867,721.  
PATENTED OCT. 8, 1907.  
M. HATZENBUEHLER.  
ELECTRIC BELT AND APPLIANCES THEREFOR.  
APPLICATION FILED JAN. 7, 1907.
2 SHEETS—SHEET 1.
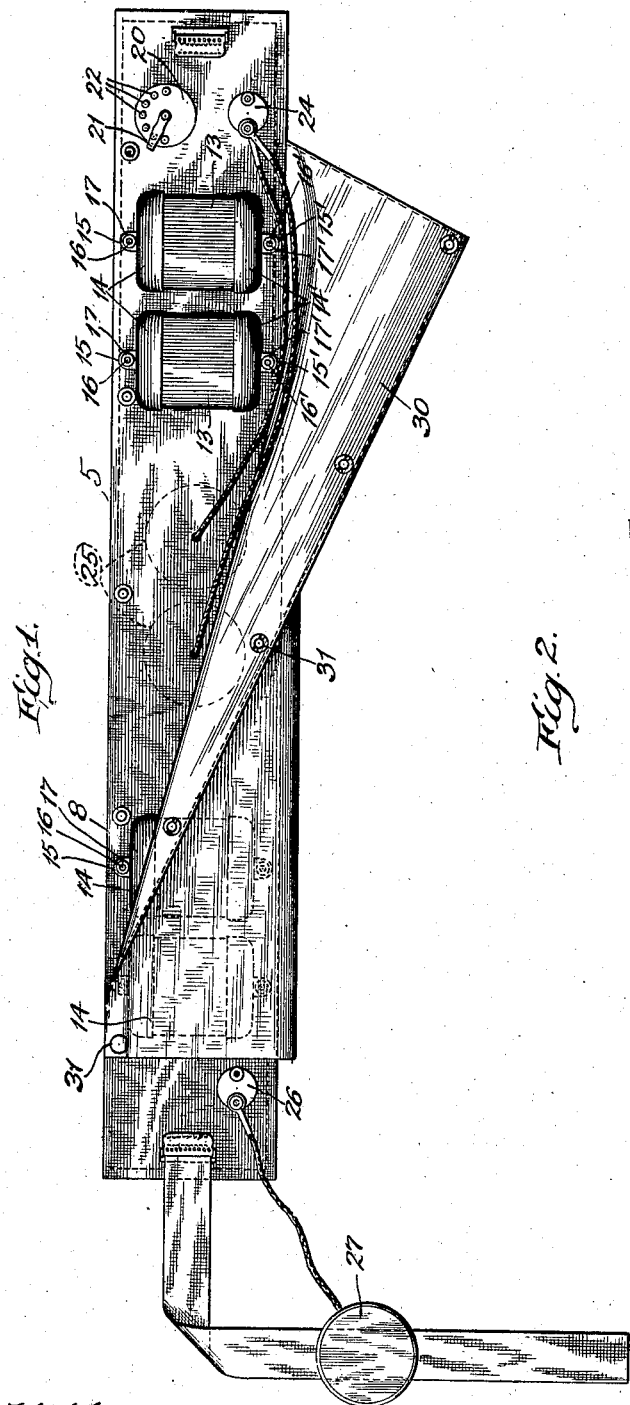
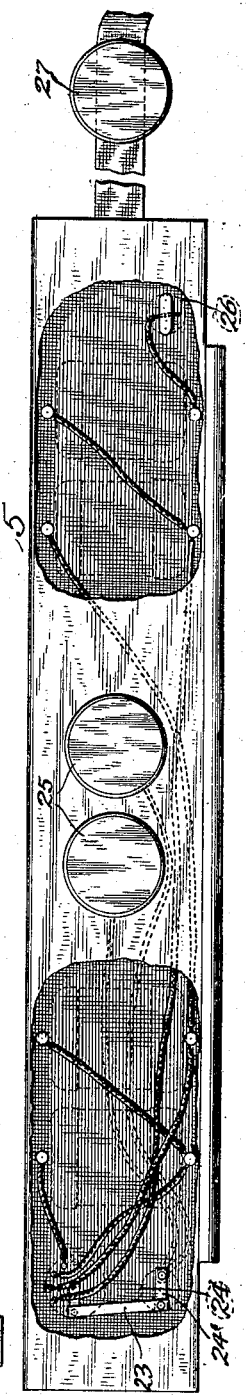
Witnesses  
Harry R. L. White  
Ray. White
Inventor  
Michael Hatzenbuehler  
By Foree Bain & May  
Attys No. 867,721. PATENTED OCT. 8, 1907.
M. HATZENBUEHLER.
ELECTRIC BELT AND APPLIANCES THEREFOR.
APPLICATION FILED JAN. 7, 1907.

2 SHEETS—SHEET 2.

Witnesses
Harry R. L. White
Ray White

Inventor
Michael Hatzenbuehler
By Foree Bain & May
his Attys

THE NORRIS PETERS CO., WASHINGTON, D. C.

ial text follows:

UNITED STATES PATENT OFFICE.

MICHAEL HATZENBUEHLER, OF CHICAGO, ILLINOIS.

ELECTRIC BELT AND APPLIANCES THEREFOR.

No. 867,721.  Specification of Letters Patent.  Patented Oct. 8, 1907.

Application filed January 7, 1907. Serial No. 351,039.

*To all whom it may concern:*

Be it known that I, MICHAEL HATZENBUEHLER, a citizen of the United States, residing at Chicago, in the county of Cook and State of Illinois, have invented certain new and useful Improvements in Electric Belts and Appliances Therefor, of which the following is a specification.

My invention relates to improvements in electric belts and appliances therefor, and has for its salient object to provide an electric belt, embodying means for applying to the body of the wearer a current easily regulable as to voltage, between a relatively low minimum and relatively high maximum voltage.

Another object of my invention is to provide a belt wherein the batteries may be easily applied to or removed from the belt, and wherein the direction of current flow from the belt terminals may be reversed by reversal of the batteries without disturbance of the wiring connections.

Another object of my invention is to provide an appliance in which the regulation of voltage is accomplished by cutting in or out of circuit, by a simple means, more or less of the current producing batteries. And yet another object of my invention is to provide an improved battery for application to an electric belt.

Figure 3:
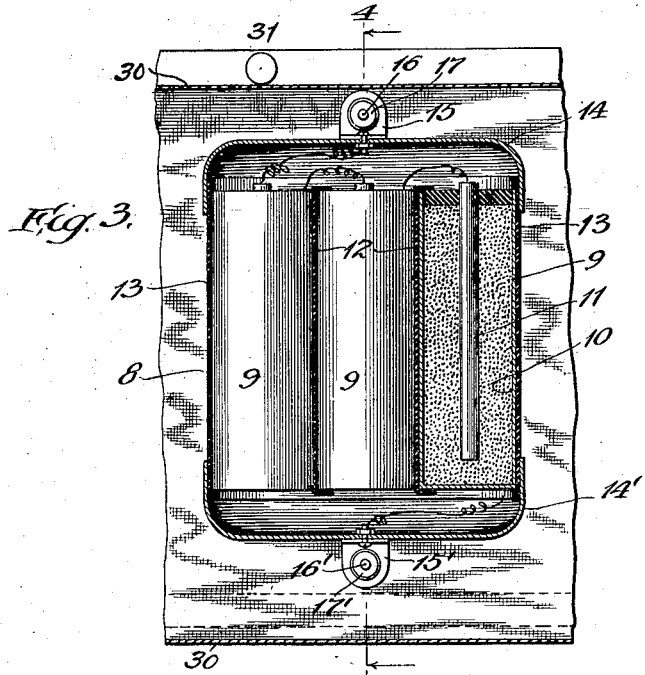
Figure 4:
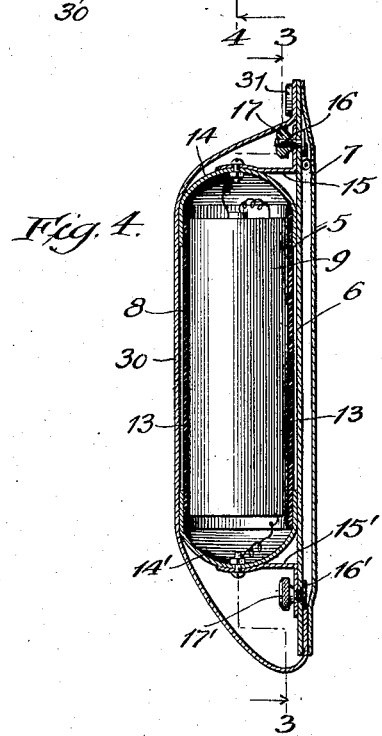

Other and further objects of my invention will become apparent to those skilled in the art from the following description taken in conjunction with the accompanying drawing, wherein;

Figure 1 is an elevation of a belt embodying my invention; Fig. 2 is a rear elevation with parts of the lining broken away; Fig. 3 is a transverse section through the battery cell on its broader dimensions, and on line 3—3 of Fig. 4. Fig. 4 is a section on line 4—4 of Fig. 3.

Throughout the drawing like numerals of reference refer always to like parts.

Referring now to the drawing, 5 indicates in general a supporting structure, such as a wide, padded portion of a belt, or other appliance, adapted to be worn upon the body of the user, and preferably composed of a stiffening or backing sheet 6, of canvas or other suitable relatively heavy material, suitably covered on its front face for artistic appearance, and on its rear face covered with a padding sheet 7, loosely applied so that the necessary wiring for the appliance may be run between the stiffening sheet 6 and the padding sheet 7.

Upon the front of the supporting structure 5 are applied a plurality of batteries, each preferably constructed as illustrated in Figs. 3 and 4, that is to say, providing in each battery a plurality, preferably two or three, dry cells 9, each comprising the usual zinc casing 10, carbon electrode 11, and "dry" electrolyte, suitably sealed in the casing. The two or three cells are arranged in parallelism, and separated by insulating bodies 12, of blotting paper or the like.

13 indicates the mid-portion of an envelop, which may be of paper or other suitable insulating material, surrounding the battery cells and provided at its ends with removable metal caps 14 and 14'. Suitable wiring is provided for connecting the several cells 9 in series, one terminal wire being led to and connected with cap 14, and the other terminal wire led to and connected with cap 14', so that the two said caps form terminal connections for the battery units, each comprising several cells.

15 and 15' indicate metal clips permanently secured to the respective caps 14, 14' in alining position, as by small bolts fixed by solder bodies, and to which may also be conveniently connected the terminal wires for the series of cells. The free ends of the clips are bent at right angles to the attached parts thereof, to lie in a common plane in alinement with a side of the battery envelop, and are suitably perforated to receive studs 16, 16', permanently attached to the stiffening piece 6 and threaded to receive thumb nuts 17, by which the clips, and consequently the battery rigidly attached thereto, may be detachably positioned in place upon the belt proper.

It will be observed that the structure thus described is symmetrical in the arrangement of its attaching means so that it may be applied with either terminal 14 or 14' in engagement with either permanent stud, 16 or 16' and may readily be reversed in position without disturbing the studs 16 or the wiring connected to the electrodes, as hereafter described.

Upon a suitable point on the belt I provide a circuit controller 20, comprising a movable arm 21 and a series of contact points 22 in number preferably one greater than the number of current producing units or batteries upon the belt. The movable arm 21 of this controller is connected by suitable conductors 23 and 24' with a terminal plate 24 upon one end of the belt pad, and to such terminal are connected a pair of body electrodes 25.

26 indicates the opposite terminal plate to which are connected the body electrodes 27.

The wiring for the batteries is preferably arranged as follows: From terminal plate 26 connection is made with the post 16' to which the nearest battery is connected, and from the opposite post 16 connection is made through the post 16' of the next battery to the first active contact point of the switch 20; from the post 16 of said second battery connection is made to post 16' of the next battery and thence to the second active contact of the switch, and so on throughout the total number of batteries employed. Thus it will be observed that when the arm 21 of the switch is thrown to the first contact, current passes from the first battery alone through the switch to terminal 24, thence through the electrodes 25, the body of the wearer, the electrodes 27 and plate 26 back to the opposite terminal of said single battery. If the switch be moved a point further two batteries are cut into the circuit, and so on, so that the intensity of the current may be positively and easily regulated. Furthermore it will be observed that the maximum voltage afforded by the belt is high, as a plurality of independent cells are included in series in each battery, and a series of such batteries are included in the circuit.

To change the direction of passage of the current it is needful only to reverse the batteries without disturbing the connections in any way.

For covering the batteries I preferably provide upon the belt a flap 30, which may be fastened in closed position by means of snap buttons 31 or any other approved fashion.

Having thus described my invention, what I claim and desire to secure by Letters Patent, of the United States, is:

1. In an electric belt, studs permanently secured to said belt and adapted to form part of the electric circuit thereof, a battery having terminal clips permanently secured thereto and connected with the battery terminal, said clips being symmetrically disposed and arranged each for connection with either of the studs whereby the battery may be reversed relative to the permanent studs.

2. In an electric belt, body electrodes, studs permanently applied to said belt, and adapted for inclusion in the circuit with said electrode, and a battery adapted for connection with said studs comprising current producing means, a casing therefor having metallic end pieces insulated from each other and respectively connected to the terminals of the current producing means, and clips secured to said metallic caps, adapted for detachable connection with the studs upon the belt.

3. In a device of the character described, a supporting body, studs secured thereto, adapted for inclusion in an electric circuit, a battery for connection with said studs comprising a current producing means, a casing therefor having an electrically non-conducting mid-portion and electrically conducting end pieces, clips permanently secured to said end pieces and adapted to engage the permanent studs upon the supporting structure, said clips and studs being symmetrically arranged, whereby the battery may be reversed upon the studs.

4. In a device of the character described, a supporting structure, studs thereon, a battery comprising a plurality of current producing cells electrically connected, an envelop for said plurality of cells, comprising an insulated mid-portion and electrically conducting caps, said caps being connected with the cells for inclusion in the electric circuit, and clips permanently secured to said caps adapted for connection with the studs upon the supporting structure.

In testimony whereof I hereunto set my hand in the presence of two witnesses.

MICHAEL HATZENBUEHLER.

In the presence of—
    GEO. T. MAY, Jr.,
    MARY F. ALLEN.